(12) United States Patent
Skinner

(10) Patent No.: US 10,440,896 B2
(45) Date of Patent: *Oct. 15, 2019

(54) SYSTEM FOR AUTOMATED MONITORING AND MAINTENANCE OF CROPS INCLUDING INTERMEDIARY SENSING UNIT

(71) Applicant: Paul W. Skinner, St. Helena, CA (US)

(72) Inventor: Paul W. Skinner, St. Helena, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/469,381

(22) Filed: Mar. 24, 2017

(65) Prior Publication Data

US 2017/0295732 A1    Oct. 19, 2017

Related U.S. Application Data

(60) Continuation of application No. 13/964,899, filed on Aug. 12, 2013, now Pat. No. 9,635,815, which is a continuation of application No. 12/345,401, filed on Dec. 29, 2008, now Pat. No. 8,528,834, which is a continuation of application No. 10/626,476, filed on Jul. 23, 2003, now Pat. No. 7,487,925, which is a division of application No. 09/872,477, filed on May 31, 2001, now Pat. No. 6,874,707.

(51) Int. Cl.
| | | |
|---|---|---|
| *A01G 2/00* | (2018.01) | |
| *A01G 17/02* | (2006.01) | |
| *A01G 25/02* | (2006.01) | |
| *A01G 25/16* | (2006.01) | |
| *A01G 27/00* | (2006.01) | |

(52) U.S. Cl.
CPC .............. *A01G 2/00* (2018.02); *A01G 17/02* (2013.01); *A01G 25/02* (2013.01); *A01G 25/16* (2013.01); *A01G 27/003* (2013.01)

(58) Field of Classification Search
CPC .......... A01G 1/00; A01G 17/02; A01G 25/02; A01G 25/16
USPC .............. 239/69, 71, 310, 542; 47/1.7, 48.5, 47/58.1 R, 62 R
See application file for complete search history.

(56) References Cited

U.S. PATENT DOCUMENTS

| | | |
|---|---|---|
| 3,889,881 A | 6/1975 | Cunningham et al. |
| 4,015,366 A | 4/1977 | Hall, III |
| | (Continued) | |

OTHER PUBLICATIONS

Rieger, Ted; Wireless Vineyard Monitoring Technology; Vineyard & Winery Managment; Mar./Apr. 2007; pp. 1-8.

(Continued)

*Primary Examiner* — Justin M Jonaitis
(74) *Attorney, Agent, or Firm* — Trellis IP Law Group, PC

(57) ABSTRACT

A system for automating the growing of crops, such as grapevines. Combinations of data from sensors local to a vineyard, and from optional remote stations and sensors, is combined with a control system to accurately control the dispensing of water and chemicals such as insecticides, disease prevention fungicides and fertilizers. The materials are dispensed through a multiple channel conduit which allows conflicting, or incompatible, types of materials to be transported through a common assembly. Sensors are attached to the conduit so that the placement of sensors can occur simultaneously with the laying of the conduit. This approach also ensures correct placement and spacing of the sensors with respect to each plant, or plant area, to be monitored and treated.

5 Claims, 5 Drawing Sheets

(56) References Cited

U.S. PATENT DOCUMENTS

| | | |
|---|---|---|
| 4,196,853 A | 4/1980 | Delmer |
| RE31,023 E | 9/1982 | Hall, III |
| 4,354,639 A | 10/1982 | Delmer |
| 4,503,707 A * | 3/1985 | Rosa ............ G01D 3/0365 341/119 |
| 4,567,563 A | 1/1986 | Hirsch |
| 4,852,802 A | 8/1989 | Iggulden et al. |
| 4,930,934 A | 6/1990 | Adkins |
| 4,991,341 A | 2/1991 | Douglas |
| 5,124,942 A * | 6/1992 | Nielsen ............ H02J 7/35 715/713 |
| 5,135,174 A | 8/1992 | Chaplinsky |
| 5,137,216 A | 8/1992 | Hanish |
| 5,139,044 A | 8/1992 | Otten et al. |
| 5,193,744 A | 3/1993 | Goldstein |
| 5,232,160 A | 8/1993 | Hendrickson et al. |
| 5,277,256 A | 1/1994 | Bailey |
| 5,364,032 A | 11/1994 | De Frank |
| 5,735,470 A | 4/1998 | Ohe et al. |
| 5,793,035 A | 8/1998 | Beck et al. |
| 5,794,849 A | 8/1998 | Elder |
| 5,857,493 A | 1/1999 | Matz |
| 5,927,603 A | 7/1999 | McNabb |
| 6,058,661 A | 5/2000 | Hand et al. |
| 6,314,979 B1 | 11/2001 | Lips |
| 6,444,975 B1 | 9/2002 | Reusch |
| 6,527,205 B2 | 3/2003 | Andersson et al. |
| 6,947,810 B2 | 9/2005 | Skinner |
| 7,069,094 B2 | 6/2006 | Kubota et al. |
| 7,096,094 B2 | 8/2006 | Addink et al. |
| 7,487,925 B2 | 2/2009 | Skinner |
| 8,434,697 B1 | 5/2013 | Olt |
| 8,528,834 B2 | 9/2013 | Skinner |
| 9,635,815 B2 * | 5/2017 | Skinner ............ A01G 17/02 |
| 2002/0024665 A1 | 2/2002 | Masten |
| 2002/0168692 A1 | 11/2002 | Cass |

OTHER PUBLICATIONS

Coatney, Kathy; "New Meets Old: Emerging Technologies Help in Managing Biodynamic Farm"; California Farm Bureau Federation; Mar. 28, 2007; pp. 1-3.

Database WPI, Section PQ, Week 198328, DerWent Publications Ltd, London GB; AN 1983-709356, XP002213176 & NL 8105 161 A; Jun. 16, 1983.

* cited by examiner

SYSTEM FOR AUTOMATED MONITORING AND MAINTENANCE OF CROPS INCLUDING INTERMEDIARY SENSING UNIT

CROSS REFERENCES TO RELATED APPLICATIONS

This application is a continuation of the following application, U.S. patent application Ser. No. 13/964,899, filed on Aug. 12, 2013, which is a continuation of the following application, U.S. patent application Ser. No. 12/345,401, filed on Dec. 29, 2008, which is a continuation of the following application, U.S. patent application Ser. No. 10/626,476, filed on Jul. 23, 2003, which is a divisional of Ser. No. 09/872,477 filed on May 31, 2001 which are hereby incorporated by reference, as if they are set forth in full in this specification:

BACKGROUND OF THE INVENTION

This invention relates in general to a system for automated control and more specifically to a system for monitoring and managing crop growth.

Agriculture has been an important aspect of human existence for many years. Improvements in caring for crops, accelerating crop growth, ensuring the quality of crops and providing for a plentiful and efficient harvest have continued to contribute to the enjoyment and improvement of our population's quality of life.

Important areas for automation of agriculture include irrigation, protection against weather, insects and disease, and providing for plant nutrition. Also, it is important to be able to forecast crop growth and harvests so that the economics of harvesting and distribution can be more efficient.

One example of a type of crop that has benefited greatly from recent trends in automated agriculture is the grape which bears fruit used to make wine. Today's vineyards include different dispensing systems for providing water to crops for irrigation. Examples of such systems are "drip" or "sprinkler" systems where water is routed among rows of vines by a tube having emitting holes spaced at regular intervals. The water flow can be turned on or off manually, or can be automated with a timer control, computer, etc. The tubes can be elevated above the ground, or at or below ground level.

While such irrigation systems have proven effective, they do not provide a high level of automation. For example, care must be taken to provide the proper amount of water over time to the crops. Also, it is difficult to selectively provide different amounts of water to different plants, or even plant rows or areas. Some growers rely on many sources of sophisticated information to decide on the times and amounts of irrigation. The plant sizes, weather conditions and forecasts, soil conditions, etc., must be taken into account. The analysis can be performed by each grower, independently, or can be provided by a service to which growers subscribe to help each grower determine how to irrigate. Although, such systems often do achieve improved irrigation, the irrigation process, overall, requires much human participation and is prone to errors and inefficiencies. For example, just measuring the amount of water dispensed to vines is difficult. Although the amount of water injected into the system is easily obtained, it is usually unknown how much water is actually provided to the vines' roots.

Fertilizers and insecticides are typically applied with the use of machinery such as spraying machines and tractors. The application of these chemicals is both vital and complicated. Machine spraying of chemicals requires human action and judgment. Further, application of the chemicals at the wrong time, or under the wrong conditions, can result in violation of laws, ineffective application, crop loss, increased expenses, etc. Growers must be aware of weather and wind conditions so that certain chemicals do not become dispersed to neighboring properties and so that the chemicals have their intended effect on the crop being treated. Many chemicals are restricted and their use must be closely monitored to comply with regulations. The application of chemicals is very labor-intensive and expensive not only in terms of human labor but also for the chemicals, themselves, application methods, fuel used by equipment, etc.

Some rudimentary chemical dispensing systems exist that are similar to the tube irrigation systems. However, a tube dispensing system can not efficiently handle all of the different chemicals that need to be applied. This is because some of the chemicals can not be mixed with others so it is necessary to flush the system with water between application of different chemicals. As with water irrigation, it is difficult to determine how much chemical (or other material) is being dispensed to each vine, row, or even section of vineyard. Further, extensive monitoring, forecasting and other information must be obtained to perform an analysis and determine the proper time to apply an insecticide, fungicide, nutrient, etc. Often, today's growers irrigate and apply chemicals without sufficient regard to available weather data, soil moisture status, statistics, analysis and other crucial data. This can result in crop failure, lower quality crops, or inefficiencies in growing and harvesting that lead to lower profits and the inability to increase subsequent crop quality and/or yields.

For example, the majority of fungicide applications are made based on temperature and humidity information obtained and applied in a rudimentary manner by the vineyard operator, or by basic visual inspections of the vineyard on a semi-frequent basis. This technique of scouting or tracking basic weather data is generally sufficient, however, it can and often does, lead to late application of products after disease is present in the vineyard.

Once disease is present, there is less time available for the grower to get protective fungicides applied and there is generally always a resulting decrease in quality of the grapes in the affected areas. Fungicides are applied by the grower to the affected areas by way of tractor mounted or pulled spray equipment which directs fungicide sprays at the vines. Depending on how quickly the disease is progressing, and how quickly the grower can make an application to all the affected areas, the results can be quite devastating to both yield and quality. It can also have a significant affect on the maturation process of the grapes which has an impact on the final quality as well.

The current methods of applying fungicides and insecticides rely on the use of tractor or trailer mounted application equipment. The spray is directed at the canopy and the coverage is limited by the water volume used. The volume used is regulated by the pressure of the spray pump and the speed that the tractor moves through the vineyard. There is a tradeoff between coverage based on water volume and timing to cover the acres to be sprayed. The more water that is used, the better the coverage but the slower the tractor moves through the vineyard. Therefore, when better coverage is desired, it takes longer to make the necessary applications. This increases the cost to the grower and creates more potential for disease development before protective fungicides can be applied. It also increases exposure to the applicators as they spend more time in the vineyard while making the application. This method of application relies on the availability of tractors in good working order to make the applications. This requires the grower to keep equipment in good working order at all times and increases risk based on breakdowns of equipment during critical application timings.

Currently, the cost of making an application of fungicides, insecticides, nutrients, etc., actually exceeds the cost of the product being applied. Growers seek to reduce their cost of applications and to ensure that applications are made efficiently, effectively, only when necessary, at the proper time and to the exact extent necessary.

Thus, it is desirable to provide a system that improves upon one or more of the shortcomings of the prior art.

SUMMARY OF THE INVENTION

The invention provides a comprehensive system for automating the growing of crops, such as grapevines. Combinations of data from sensors local to a vineyard, and from optional remote stations and sensors, is combined with a control system to accurately control the dispensing of water and chemicals such as insecticides, disease prevention materials and fertilizers.

The materials are dispensed through a multiple channel conduit which allows conflicting, or incompatible, types of materials to be transported through a common assembly. Sensors are attached to the conduit so that the placement of sensors can occur simultaneously with the laying of the conduit. This approach also ensures correct placement and spacing of the sensors with respect to each plant, or plant area, to be monitored.

In one embodiment the invention provides a conduit for dispensing two or more different liquid types to crops. The conduit includes a first channel for conveying a first liquid type; a second channel for conveying a second liquid type; and a plurality of outlets spaced at intervals for dispensing both the first and second liquid types, wherein each outlet is used to dispense both the first and second liquid types.

DETAILED DESCRIPTION OF THE INVENTION

Figure 1:
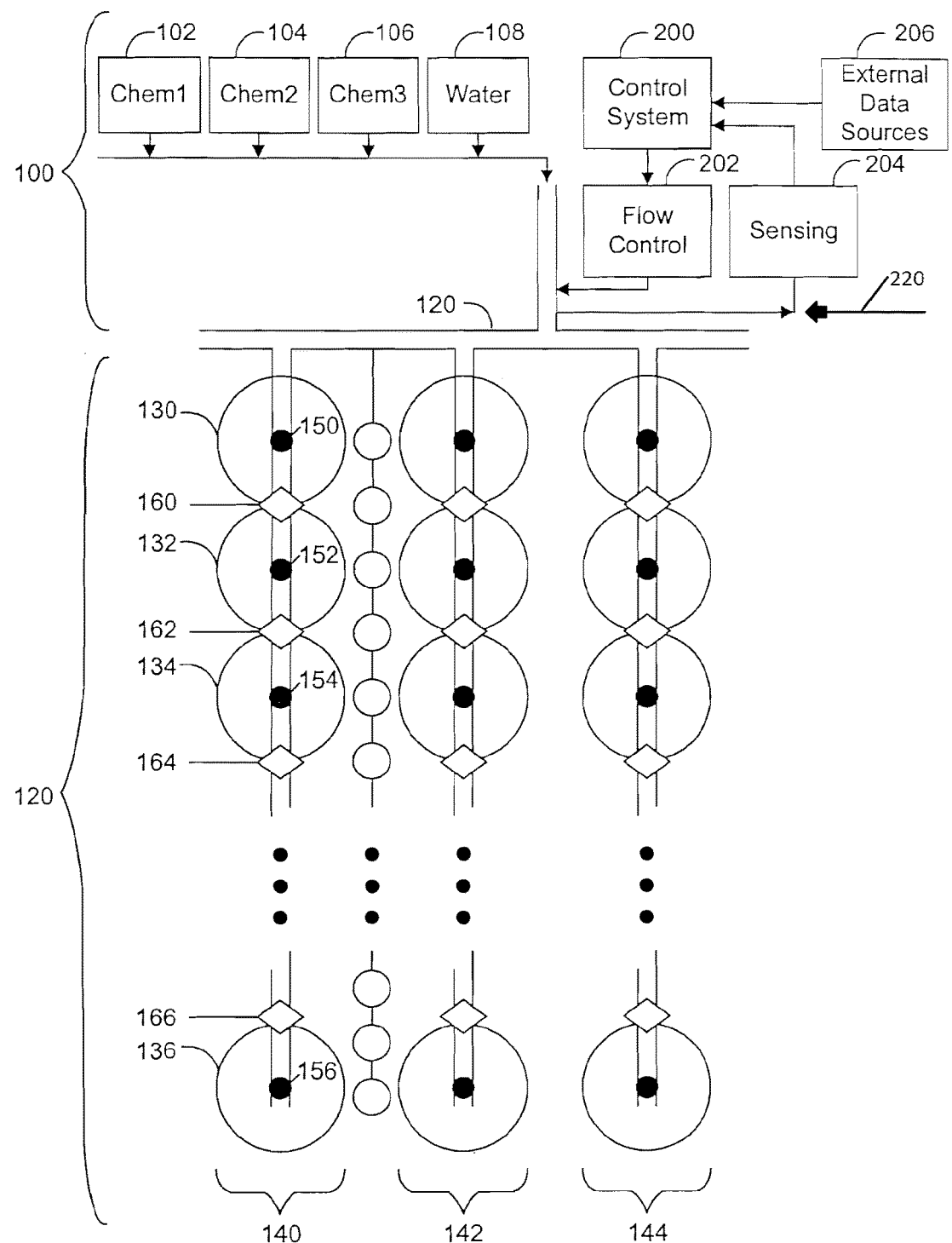
FIG. 1 illustrates the system of the present invention.

FIG. 1 illustrates the system of the present invention. A preferred embodiment of the system is referred to as the "Chemical on Demand" system manufactured and marketed by Terra Spase, Inc.

In FIG. 1, system 100 is used to deliver materials such as chemicals 102, 104 and 106; and water 108 to crops 110 via conduit 120. Examples of chemicals for delivery are fertilizer, insecticides, disease prevention fungicides or other treatments, etc. For purposes of illustration, the invention will be presented in a vineyard application. However, it should be apparent that aspects of the invention can be applied to many different crops, plants and other scenarios.

Each grapevine plant is illustrated as a circle such as vines 130, 132, 134 and 136. Vines are organized into rows such as row 140, 142 and 144. Naturally, there can be any number of vines in a row and any number of rows. Although modern vineyards follow this row and grid pattern, the present invention can be adapted for use with any regular, ordered arrangement of plants. Also, aspects of the invention can be used on a small scale even where the layout of a vineyard, field, garden, etc., is not regular, ordered or is otherwise not uniform. However, consistent spacing of plants and rows has advantages in the manufacture, deployment and operation of conduit emitters and sensors, as discussed, below.

Conduit 120 houses multiple inner channels (not shown). In a preferred embodiment, there are enough channels to handle dispensing of each of the different materials (i.e., chemicals and water, as shown, although other embodiments can use any number of different materials). Particularly, where two materials are incompatible with each other, such as calcium and phosphorus solutions, then it is advantageous to maintain each solution in a separate channel of the conduit so that a shared channel will not have to be cleansed, or flushed, before using a different incompatible solution. A preferred embodiment of the invention uses four channels plus the conduit cavity to convey water, fungicides, insecticides, fertilizers, and other materials, as desired. Since different applications will require different numbers of materials, conduits can be manufactured with appropriate numbers of channels, channel sizes, etc., as discussed below.

FIG. 1 shows outlets, or emitters, from the conduit and channels as black dots such as emitters 150, 152, 154 and 156. Each emitter can emit any of the materials transferred through channels in the conduit. Each emitter is present at a regularly spaced interval on the conduit in accordance with the spacing of the vines, as desired. Typical vine spacing is between 36" and 96". As is known in the art, the materials can be dispensed either above the plants, overhead, on the ground or even below the ground. The materials, if in liquid form, can be sprayed in addition to being dripped. A preferred embodiment of the invention uses under vine canopy drippers for nutrient and irrigation dispensing and uses above vine spraying with sprinklers or misters for fungicide and insecticide dispensing as well as water for cooling. The conduit housing the channels is suspended from the existing trellis in the vineyard that is used to support the growing grapevines. Other embodiments can allow the conduit to be placed on the ground, e.g., near the base of the vines; or even to be buried below ground.

Sensors 160, 162, 164 and 166 are attached to the conduit at regular intervals in accordance with the spacing of the vines. In FIG. 1, sensors 160, 162, 164 and 166 are photodetectors for measuring sunlight which passes through the grape leaves. The larger the vine canopy, the less sunlight will fall on the photodetectors. Thus, a measure of the vines' growth is indicated by the cumulative signals of the photodetectors. Other types of sensors can be employed such as leaf wetness detectors, temperature, insect indicators (e.g., protein and DNA sensors), etc. Different types of sensors can be used at the same point or at different points. Since the sensors are attached to the conduit at regular intervals corresponding to the vineyard layout, the deployment of the sensors is very simple. Also, the regularity of the sensors with respect to the vineyard layout produces more interpretable results.

Materials are dispensed under control of control system 200 and flow control 202. In a preferred embodiment control system 200 is a computer such as a personal computer, server, etc. However, any type of control system can be used such as a smaller digital system, analog system, mechanical, etc. Flow control 202 includes valves and flow monitors for letting a predetermined amount of any of the chemicals or water enter the conduit channels under control of control system 200.

The output signals from sensors is received by sensing unit 204 and relayed to control system 200. Sensing unit 204 can be, for example, a transducer for converting an analog signal to a digital signal. If the sensors, themselves, are outputting digital information then sensing unit 204 can act to multiplex, buffer, or otherwise manipulate or pre-process the data before sending the data to control system 200. In some embodiments, sensing unit 204 may not be necessary.

External data is received by control system 200 via external data sources 206. Such data sources can include information from local networks or wide area networks such as the Internet. Examples of external data include weather data, crop growth models, growing degree days, $ET_o$ and $ET_c$ (evapotranspiration coefficients), degree day insect models, disease risk models, irrigation requirements, crop nutrition requirements, crop development data, etc. The external data can come from a remote station, sensor, agency, or other source. The external data can also be generated by software (e.g., modeling, forecasting or analysis programs) that is located locally to the control system or which is remote from the control system. External data can be entered manually by the user or operator of the control system, or can be received automatically by the control system via a communication link or network such as the Internet. In general, data processing and acquisition can be performed in any geographic location and used in any manner known in the art to facilitate the operation of the system of the present invention.

Sensor data can be used in sophisticated analysis to control irrigation and application of other chemicals or materials. For example, the system can control application of materials according to methods described in academic papers such as IRRIGATION OF THOMPSON SEEDLESS TABLE GRAPES: UTILIZATION OF CROP COEFFICIENTS DEVELOPED AT THE KEARNEY CENTER FOR USE AT OTHER LOCATIONS IN THE SAN JOAQUIN VALLEY, by Larry E. Williams, Don Luvisi and Michael Costello; published in Viticulture Research Report Volume XXVII, 1998-99, California Table Grape Commission, Fresno, Calif. 93711 which is hereby incorporated by reference as if set forth in full in this document for all purposes. Publicly available data such as at http://www.ipm.ucdavis.edu/, etc., can be used to provide rules and guidelines for controlling material dispensing according to the system of the present invention.

Sensor line 220 represents additional sensors that are not affixed to conduit 120. Such additional sensors can be arbitrarily set at any point in the vineyard, either above or below vines or the ground. Additional sensors, such as soil nutrient and moisture sensors, may be needed in a different location than can be provided by the conduit.

Although a preferred embodiment of the invention uses a centralized control system, other embodiments can use distributed, or dedicated, processing at many points. For example, groups of emitters and sensors, or even each individual emitter and sensor, can have intelligent control. A microprocessor can use input from one or more sensors to control an emitter local to the sensor. This is useful where different parts of a vineyard need different degrees of irrigation. Some plants may be exposed to insects or disease and not others. With more finely-grained monitoring and control (achievable by either a centralized control system or distributed system) delivery of chemicals, water, and other materials can be made to only the exposed plants. Thus, a savings of chemicals is realized and plants that are not in need of treatment do not need to be risked by the application of unnecessary treatment.

Note that the preferred embodiment of the invention allows the conduit to be routed in existing trellis frameworks. Typically, no moving parts are used except for pumps in the flow control which are centrally located. In contrast to prior art methods, there is no tradeoff on water volume when spraying fungicides or insecticides as the amount of water to be used will be based on the best recommendation for coverage of the canopy for optimum pesticide performance. Once disease is detected, applications can be made immediately and as often as required.

Applications can be made to as many acres as the grower has pre-established for a given mix tank and pump set-up. Applications will require only minimal labor to pre-mix the pesticide and applicator exposure will be limited to only the mixing and loading operation. There will be no variability in the amount of pesticide applied as in the existing application methods which are based on speed of the tractor and pump pressure. Pre-calibration of the COD system will determine the timing needed to apply the desired amount of pesticide based on the pre-mix concentration and the total desired water volume. Pump pressure can be monitored, and if desired, flow control valves can be installed to further refine the actual volume applied. Pressure control valves installed throughout the piping framework will ensure equal application volume for the entire length of the trellis run, even at the furthest ends from the mix tank and pump. Using this system, an entire vineyard can be sprayed in less time that it takes to spray only a small block today with less risk and variability.

Thus, the invention creates value for growers by reducing their cost of applications and by reducing risks involved with making sure applications are made at the right time and in a timely manner. Additionally, growers can realize improvements in yield and quality of the high valued fruit. The invention provides more accurate timing of applications and better coverage of the vines, resulting in better disease management—one of the primary factors of quality and yield.

Figure 2A:
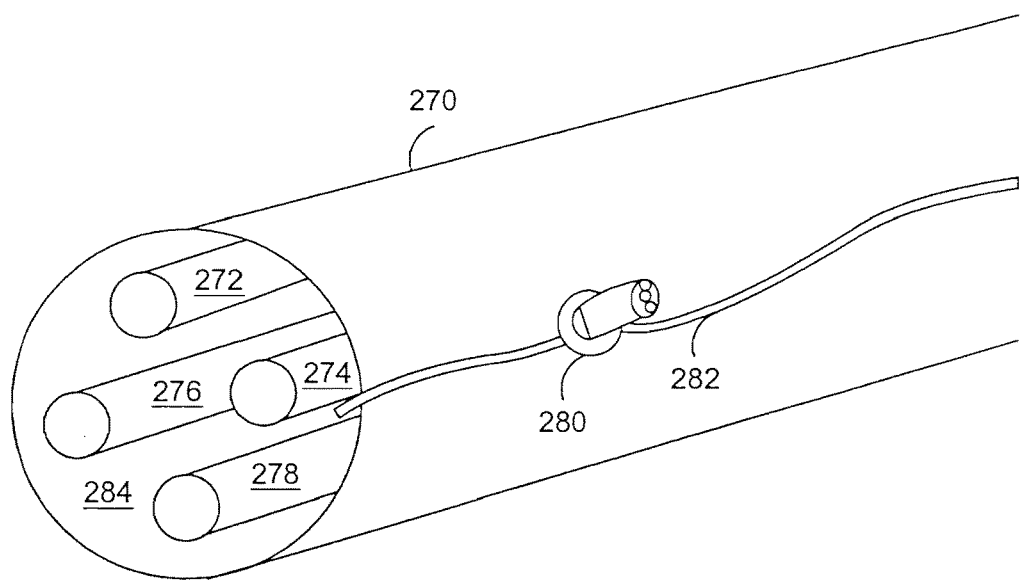
FIG. 2A illustrates a cut-away view of a conduit.

FIG. 2A illustrates a cut-away view of conduit 120 of FIG. 1.

In FIG. 2A, conduit 270 houses four channels 272, 274, 276 and 278. Emitter 280 is representative of emitters mounted onto conduit 270 at regularly-spaced intervals as described, above. Sensor and control cable 282 includes wires, fiber optic cables, etc. for communication with sensors, valves and other devices along conduit 270. Cable 282 can be fixedly secured along conduit 270, as desired.

Channels 272, 274, 276 and 278 can be used to dispense chemical solutions or other materials from the conduit. Additionally, the conduit has cavity 284 that can be used for dispensing water. In a preferred embodiment, each channel is a separate tube that is sealed from the other channels and from the cavity. Other embodiments can form channels as part of the conduit walls, integral with the conduit construction. Other designs are possible—for example, the cavity need not be used to dispense materials.

Figure 2B:
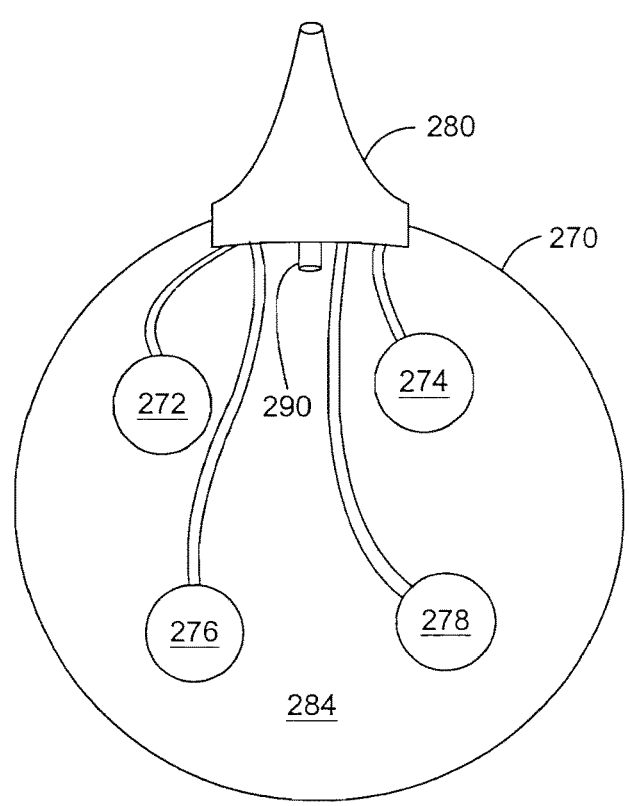
FIG. 2B shows a cutaway view of the conduit of FIG. 2A.

FIG. 2B shows a cutaway view of conduit 270 of FIG. 2A.

In FIG. 2B, capillary tubes are shown between each channel and emitter 280. Emitter 280 includes a valve mechanism that can select materials in any of the channels. Additionally, inlet 290 allows emitter 280 to select materials (e.g., water) in cavity 284. An emitter can use a computer-controlled valve-in-head system with multiple valves, as needed.

Each of the several, or many, emitters on the conduit is independently controllable by the control system of FIG. 1. Thus, each channel, and the cavity, can be flooded with material to be dispensed and the dispensing can subsequently be controlled by the control system. Alternately, the emitters can be passive, for example, they can be simple through-holes sprinkler heads so that they are always "on" for all dispensing. In this latter case, the flow is controlled by flow control 202 of FIG. 1, under the control of the control system. The flow control will then include a selective pump station for pumping materials into selected channels, or the conduit cavity, under the direction of control system 200. Other variations are possible.

Figure 2C:
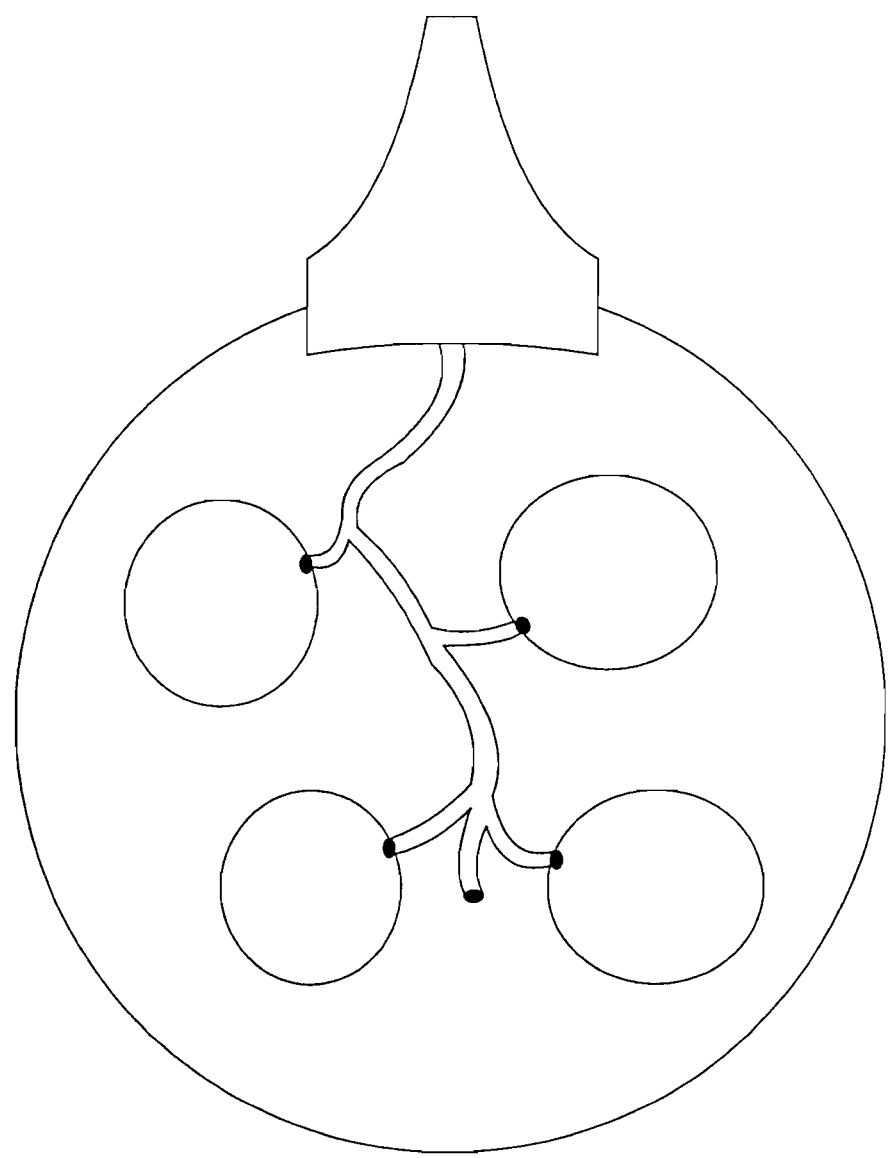
FIG. 2C shows a common-capillary arrangement.

FIG. 2C shows a common-capillary arrangement where a single branching capillary is used for all of the channels and cavity. In this arrangement, the emitter has a single-valve control. Dispensing is accomplished by both flooding the appropriate channel and then controlling the valve to dispense the material. Simple one-way valves are shown as dark circles. These valves prevent mixing of materials among the channels.

Note that many types of conduit can be employed. The conduit need not be a completely enclosed "tube" as shown in FIGS. 2A-C. For example, the conduit can be comprised of bands or straps used at intervals to bundle together the tubes, or channels. In this case, emitters and sensors can be affixed to the bands or to one or more of the channel tubes. The conduit can be a flexible spiral of material within which the channel tubes are held. The conduit can be a tray, or trough, that is open at the top. Other variations are possible.

In a preferred embodiment, the conduit, channel, emitter and sensor assembly is flexible. This allows the conduit to be bent to follow paths among rows, as desired. Other embodiments can provide stiff piping with a means for joining additional pipe sections at different angles to achieve bends.

Figure 3:
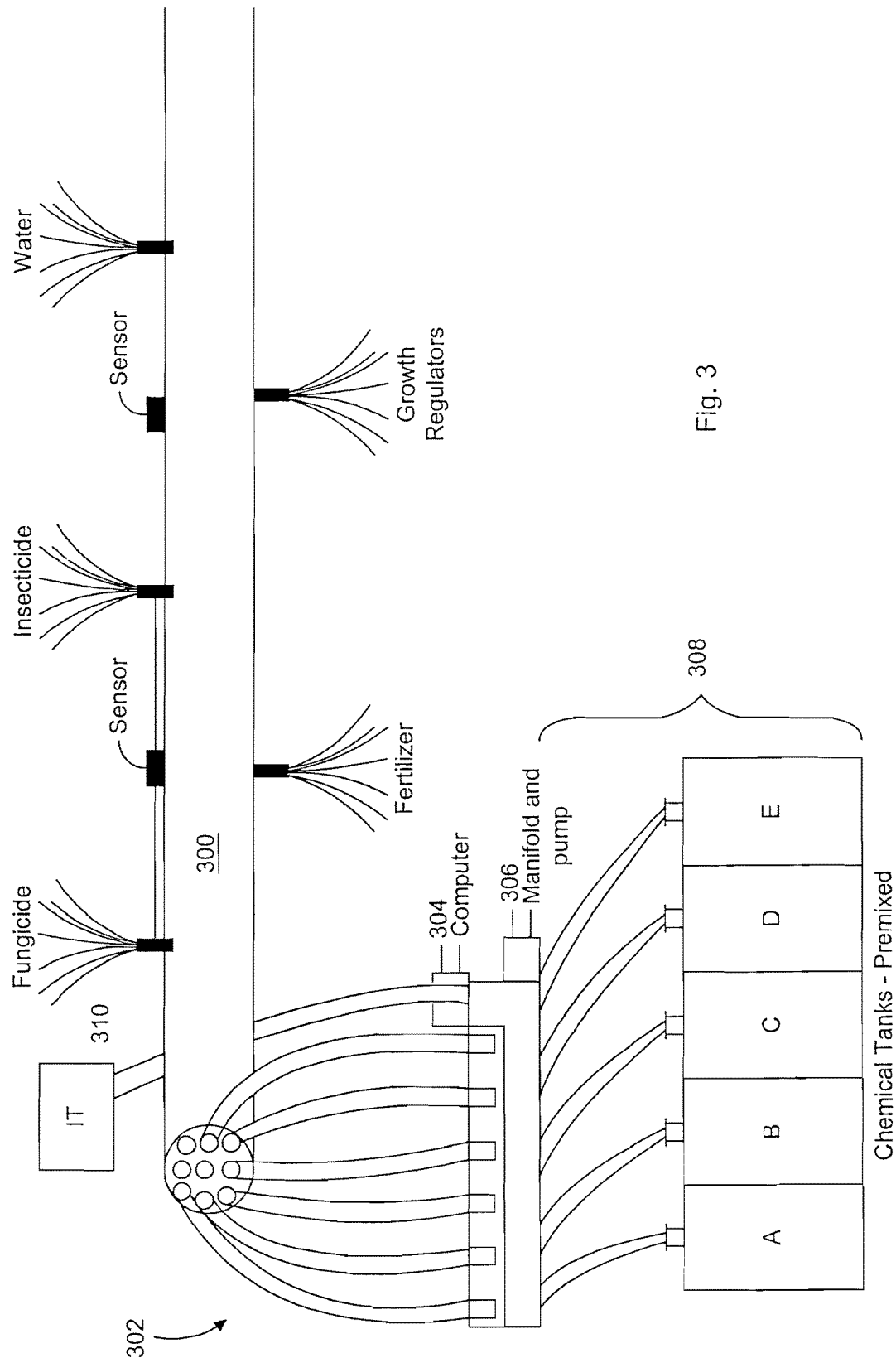
FIG. 3 shows details of the system of FIG. 1.

FIG. 3 shows details of the system of FIG. 1.

In FIG. 3, channel terminations 302 are connected to chemical tanks (and water) via manifold and pump 306. The flow of each chemical is controlled by computer 304 in accordance with interface 310. A preferred embodiment allows for many types of control configurations. A user can configure dispensing of each chemical at predetermined times and for specified amounts. Another option is for sensor data to automatically trigger dispensation. For example, an optical sensor can help determine the size of vine leaf area (or other crops) based on the amount of light that is blocked so that the amount of chemicals dispensed at different points in time can be increased as the vine leaf area increases. Other sensors can report on the amount of rain, temperature and humidity, soil moisture conditions, etc., so that delivery of nutrients and water can be adjusted accordingly.

A software program that is automating the system by receiving and responding to the various sensor and control inputs can be resident locally to computer 304. This software can be configured and updated from a manufacturer or supplier. Alternatively, computer 304 can be controlled via the Internet, or other network or communication link, by a remote source, such as a service supplier. The system can be completely monitored by the service supplier. Monitoring of the entire system allows a service supplier to provide additional benefits to the grower such as automatically ordering chemical supplies, using advanced data and statistics such as satellite imagery, ground and satellite weather data, and environmental reports, ensuring that the system is functioning properly, etc.

In FIG. 3, conduit 300 includes emitter sensors on both the top and bottom of the conduit. Each emitter need not be connected to all of the channels. In a preferred embodiment, fungicides, insecticides and growth regulators are dispensed through emitters on the top of the conduit while fertilizer and water are dispensed from the bottom emitters. Naturally, other arrangements are possible. Sensors are positioned along the top of the conduit but can also be positioned anywhere on the conduit, or on additional sensor lines that are not part of the conduit.

Figure 4A:
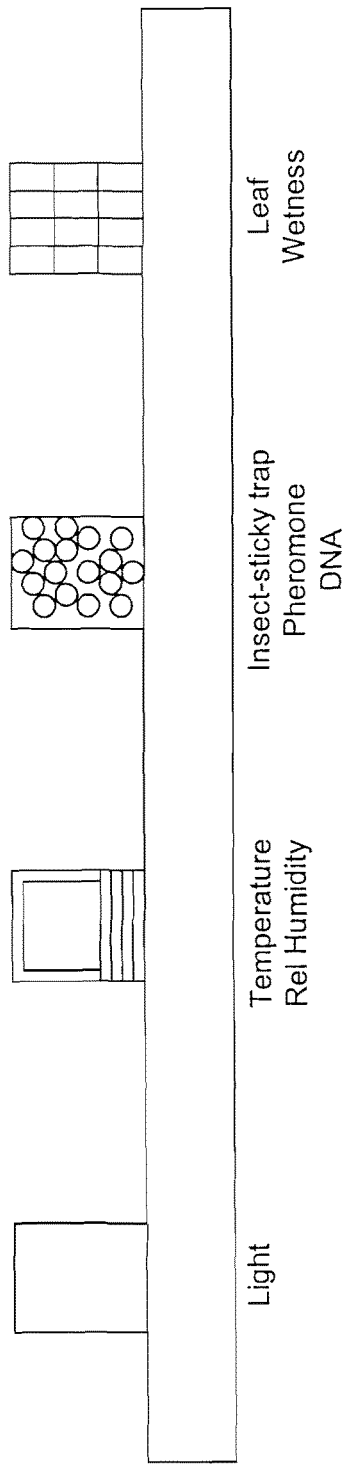
FIG. 4A is a first drawing of different types of sensors.

FIGS. 4A and B illustrate some of the different types of sensors that are appropriate for use with the present invention.

In FIG. 4A light, temperature, relative humidity, insect, and leaf moisture detecting sensors are present. Light sensors allow the canopy size or leaf area to be determined by detecting the amount of shade generated under the plant's growing leaves. Light sensors can also be used to determine how much sunlight the plants are obtaining (assuming the sensors are moved away from the plant shade). Insect detectors include sticky traps, pheromone detectors and DNA sensitive analysis tools. Leaf wetness detectors simulate the absorbency of leafs so that moisture on the surface of the detector approximates plant leaf wetness.

Figure 4B:
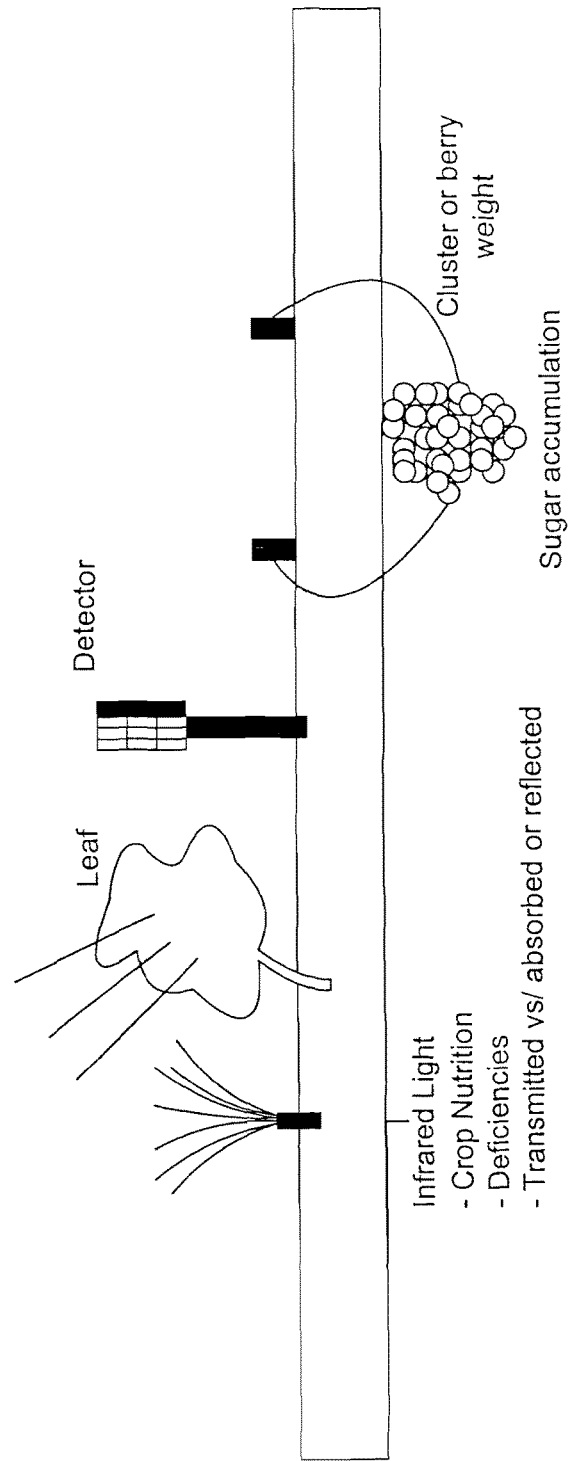
FIG. 4B is a second drawing of different types of sensors.

FIG. 4B shows additional sensors as an infrared light transmitter and detector for sensing plant nutrition and health deficiencies depending on the amount of transmitted or absorbed infrared light. Sugar accumulation in grape bunches can be determined by connecting selected bunches of grapes to pH probes or other instruments capable of measuring soluble solids (Brix) in grape berries.

By using the system of the present invention, efficiencies not possible in the prior art can be realized. The control system can accurately measure the pressure and volume of delivery of water and chemicals. The delivery of materials can be more precisely directed to where it is needed. The delivery is also performed as needed so care of the crops is more accurate and effective and there is less waste. No human intervention is necessary. Heavy mechanical devices are eliminated at a concomitant savings in fuel and maintenance costs.

Insecticides can be applied based on measurements of remote sensor data, from regional or national agencies, from local sensors, etc. This allows newly found research data on bug lifecycles and behavior to be used in growing practice almost immediately. Wind and weather sensors can be used to prevent dispensing of harmful chemicals when a chance of unwanted high dispersion is likely. Should a high wind come up during application of chemicals, the application can be immediately stopped and the dosage continued at a later time. Preventative chemicals can be applied to the crops when the "disease pressure" is high.

Crop growth rate can be accurately measured and used in application of all types of materials. Accurate projections and forecasting can be made from the detailed sensing of all aspects of crop growth and maintenance. Alarms can be triggered when urgent conditions are detected, such as insect infestations or disease. Risk evaluations can be computed based on sensor detections. Such projections and evaluations are useful for growers to profitably manage their operations.

Although the invention has been discussed with respect to specific embodiments thereof, these embodiments are merely illustrative, and not restrictive, of the invention.

For example, although the invention has been discussed primarily with respect to grapevine growing, it should be apparent that aspects of the invention can be used to advantage with any type of crop, flower, tree, fungus, or other type of plant. In general, the present invention can be used to advantage to monitor, manage and maintain a system of any type of developing entities that can benefit from controlled dispensing of materials. For example, features of the present invention may be applied to feeding and disinfecting livestock. Other applications will be apparent.

Although the materials dispensed by the present invention have been presented as primarily liquids, it should be apparent that both solid and gas material dispensing can benefit from aspects of the present invention.

Thus, the scope of the invention is to be determined solely by the appended claims.

What is claimed is:

1. A system for application of a material to a plurality of plants, the system comprising:

a plurality of sensors, wherein one or more of the sensors includes a leaf wetness detector for at least one of the plants;

a sensing unit for receiving one or more signals from the sensors;

emitters for emitting the material to a plant, wherein each emitter is associated with, and in fixed proximity to, one of the plants;

a control system for controlling emission of the material to a particular plant via the particular plant's associated emitter in response to a signal from the particular plant's associated sensor; and relay means for relaying at least one signal derived from the one or more signals, wherein the relaying is from the sensing unit to the control system.

2. The system of claim 1, wherein the sensing unit comprises:

a transducer for converting an analog signal to a digital signal.

3. The system of claim 1, wherein the sensing unit multiplexes at least two of the one or more signals from the sensors.

4. The system of claim 1, wherein the sensing unit buffers the one or more signals from the sensors.

5. The system of claim 1, wherein the sensing unit pre-processes data derived from the one or more signals from the sensors and sends at least a portion of the derived data to the control system.

* * * * *